United States Patent [19]
D'Amato et al.

[11] Patent Number: 5,473,677
[45] Date of Patent: Dec. 5, 1995

[54] TELECOMMUNICATIONS NETWORK ARCHITECTURE AND SYSTEM

[75] Inventors: Peter A. D'Amato, Red Bank; Sarah T. Fischell, Fair Haven; Paul V. Flynn, Ocean; James J. Mansell, Fair Haven; John S. Robertson, Freehold; Joel K. Young, Middletown, all of N.J.

[73] Assignee: AT&T Corp., Murray Hill, N.J.

[21] Appl. No.: 81,504

[22] Filed: Jun. 23, 1993

[51] Int. Cl.[6] .................. H04M 15/00; H04M 15/06; H04M 3/42; H04M 3/00
[52] U.S. Cl. .................. 379/112; 379/142; 379/201; 379/243
[58] Field of Search .................. 375/113, 114, 375/115, 192, 201, 207, 293

[56] References Cited

U.S. PATENT DOCUMENTS

| 4,310,727 | 1/1982 | Lawser | 389/207 |
|---|---|---|---|
| 4,348,559 | 7/1982 | Asmuts | 375/207 X |
| 5,018,191 | 5/1991 | Catron et al. | 389/207 X |

OTHER PUBLICATIONS

U.S. Patent Application, Ser. No. 07/813,708, filed Dec. 27, 1991 assigned to AT&T.

*Primary Examiner*—Stephen Chin
*Assistant Examiner*—Paul Loomis
*Attorney, Agent, or Firm*—Barry H. Freedman

[57] ABSTRACT

The present invention provides real time call control within a telecommunications network, using a call selection processor separate from the switches carrying the call, which responds to incoming calls and uses information carried in the associated signaling messages to determine what application processor, if any, should be involved on the call. One embodiment of the present invention includes a call selection processor called a signaling director", or "SD" for short, for recognizing certain signaling messages, typically SS7 initial address messages (IAM's), as the messages flow through the signaling network. Alternatively, particular signaling messages may be recognized in a signaling message processing element within the signaling network, such as the signal transfer point (STP) associated with the switch that receives the telephone calls, and a copy of those particular messages forwarded to the SD.

52 Claims, 7 Drawing Sheets

TELECOMMUNICATIONS NETWORK ARCHITECTURE AND SYSTEM

FIELD OF THE INVENTION

This invention relates generally to telecommunications, and, in particular, to a telecommunications architecture and system wherein all calls routed to a switch are examined and processed in a manner that permits "selected" calls to be differentiated from other calls, so as, for example, to allow the selected calls to receive special treatment.

BACKGROUND OF THE INVENTION

Telecommunications service providers desire to arrange their network so that the call processing logic applied to each call can be customized, i.e., each call given individualized treatment. This is advantageous from the customer (caller) point of view, since the customer will obtain better service. It is also advantageous from the network provider point of view, since it enables segment specific strategies, i.e., allows marketing tailored to individual customer groups.

Today's interexchange networks are not arranged to routinely determine customer identification and provide customized treatment at the time of call origination. Rather, existing networks have been optimized for "simple" calls, and such networks handle calls requiring special treatment on an "exception" basis. In present arrangements, the customer is not identified directly, at the beginning of the call processing process, so that customer-specific features are applied to a particular call only after a great deal of processing. The difficulty is illustrated by one example involving call processing instructions: currently, service type is first identified using a table that associates trunk group type with service type. Automatic number identification (ANI) information may be collected from the caller and sent to an ANI vs customer table, to further identify the customer. Next, the ANI and customer identification are sent to a customer vs allowed feature table, to obtain a list of authorized features. Finally, processed data obtained as a result of the foregoing table look-up is sent back to the switch that is processing the call to execute whatever call processing is appropriate. Other aspects of call treatment, such as access and egress determination and recording/billing arrangements, can be equally complex.

The problem with this approach is that the various tables just described are distributed rather than centralized. These tables have to be provisioned, i.e., stored, when a customer first obtains a service or feature, and coordinated among themselves when a customer makes a change. This is costly, complicated, time consuming and error prone. Also, there is no central record of "who has what"; this complicates customer inquiry response and maintenance of the network elements.

SUMMARY OF THE INVENTION

The present invention provides real time call control within a telecommunications network, using a call selection processor separate from the switches carrying the call, which responds to incoming calls and uses information carried in the associated signaling messages to determine what application processor, if any, should be involved on the call. One embodiment of the present invention includes a call selection processor called a signaling director", or "SD" for short, for recognizing certain signaling messages, typically SS7 initial address messages (IAM's), as the messages flow through the signaling network. Alternatively, particular signaling messages may be recognized in a signaling message processing element within the signaling network, such as the signal transfer point (STP) associated with the switch that receives the telephone calls, and a copy of those particular messages forwarded to the SD.

The SD examines information in the particular messages, generally information relating to the originating user and destination of each call, and then transmits an "action message" to the switch to direct the switch as to "what to do next". For selected calls, for example, calls that require special treatment, the SD transmits an action message to the switch, directing the switch to await further instructions. The SD then transmits a query message pertaining to the selected call to an appropriate applications processor, also determined based upon information about the calling and called parties gleaned from the IAM. After the query is processed in the applications processor, a response is returned directly to the switch, containing the required call treatment instructions. Those calls that are not "selected" calls are identified in the SD, and a "proceed" action message is sent to the switch, directing that the calls be conventionally treated.

In accordance with an aspect of the invention, the switch is arranged to wait after receiving the initial incoming call message (i.e., the IAM) and then begin a timing process in response to receipt of this call, so that if an action message for that call does not arrive within a predetermined time period, a query can be launched to obtain such action message. Likewise, if an action message that requests the switch to await call treatment instructions for a "selected" call is received, the switch can begin a second timing process, so that, if those instructions do not arrive within a predetermined time, a query can be launched to obtain such instructions.

If a call is received in a switch via a direct connection such that signaling information is provided by multi-frequency tones, ISDN signaling or other means rather than via an SS7 signaling message, then the present invention may process such calls by launching a query from the switch to the SD.

BRIEF DESCRIPTION OF THE DRAWINGS

The present invention will be more fully appreciated by consideration of the following detailed description, which should be read in light of the accompanying drawing in which.

DETAILED DESCRIPTION

Figure 1:
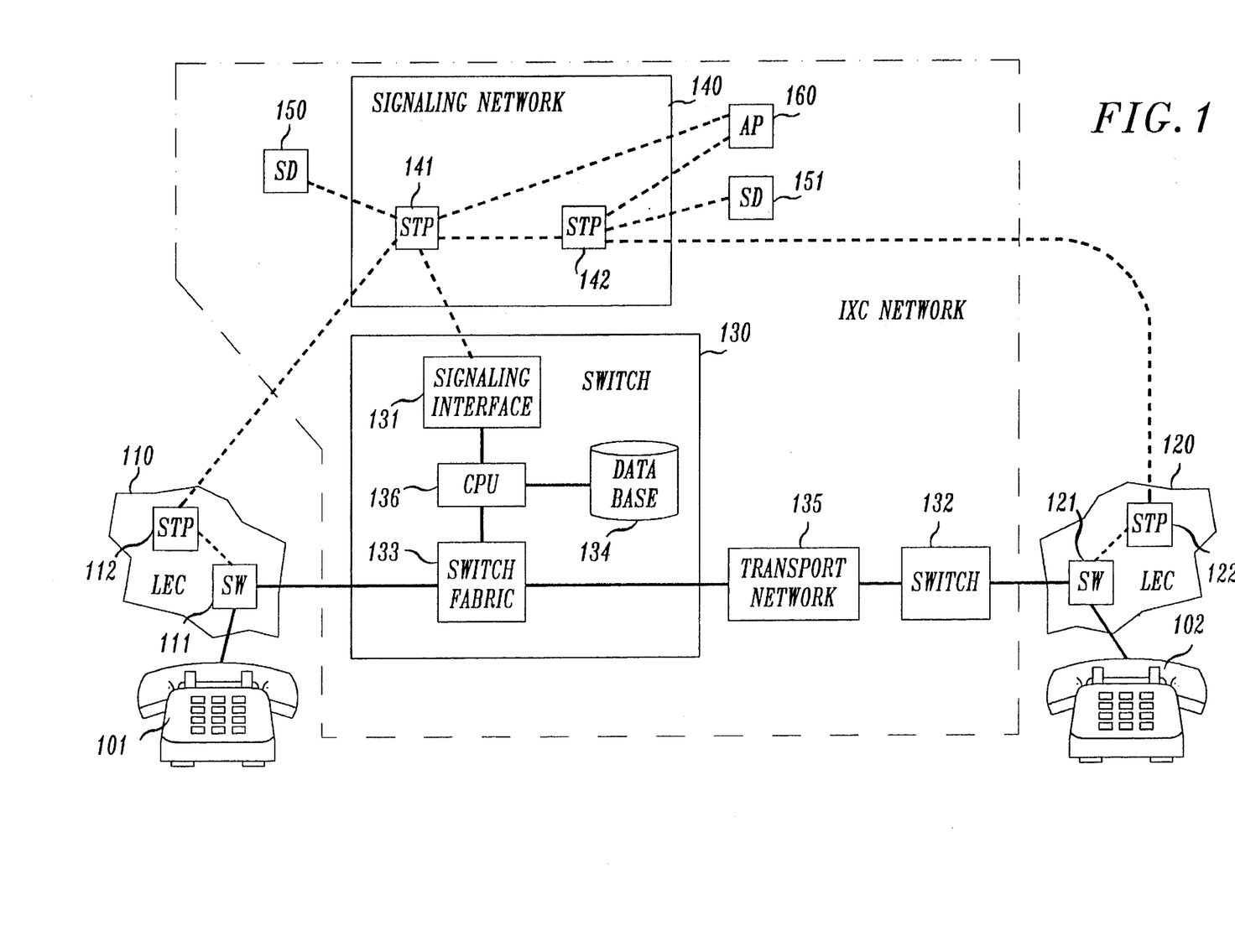
FIG. 1 is a block diagram of the telecommunications network architecture of the present invention, illustrating an implementation within an interexchange carrier network.

Referring first to FIG. 1, there is shown a block diagram of the telecommunications network architecture of the present invention, illustrating the relationship between the major components when the invention is used in the context of an interexchange carder telecommunications network, such as the network of AT&T. (Note here that the invention could also be implemented in the context of a local (intraexchange) telephone network, for example, in a terminating switch within a local exchange carder (LEC) network; this type of arrangement is discussed in more detail below. When a telephone call is originated from a point of origin, such as telephone 101, the call is received in a switch 111 of a first local exchange carrier (LEC) network 110 which serves the subscriber for that telephone. If the call is an interexchange call destined for a destination, such as telephone 102, served by a different LEC network 120, the call is connected to the appropriate gateway switch (switch 130 in FIG. 1 ) in the interexchange network. The interexchange network routes the call via a transport network shown generally as 135 to the appropriate interexchange terminating switch, switch 132 in FIG. 1, which thereafter connects the call to switch 121 in LEC network 120, that serves telephone 102. Of course, many other subscribers, not shown, are served by each LEC, many LEC's are served by the interexchange network, and the interexchange network includes many other switches. Our invention is also applicable to calls received in the interexchange network via an alternate access vendor instead of a LEC.

Signaling messages which control the process of setting up the call path through switches 111 and 121 in networks 110 and 120 and switches 130, 132 in the interexchange network may follow the well known Signaling System 7 (SS7) protocol defined by Study Group XI-Specification of Signaling System No. 7, International Telegraph and Telephone Consultative Committee (CCITT) Blue Book, Vol. 6 of Facile VI.9, Geneva, Switzerland, 1989. The signaling messages are originated and processed in a series of signaling message processors, typically signal transfer points (STP's), including STP 112 associated with originating switch 111, STP 122 associated with switch 121, and STP's 141 and 142, associated with the switches 130 and 132, respectively, and are transported between STP's using a signaling network shown generally as 140. Normally, STP's are provisioned in pairs, for reliability purposes; the "inate" to each STP in FIG. 1 is not shown. This is described in more detail below, in conjunction with FIG. 8. Signaling messages, signaling protocols, the conventional signaling network architecture, and the internal arrangement of STP's are all well known to persons skilled in telecommunications architecture development, and are described, for example, in an article by Modarressi and Skoog entitled "Signaling System No. 7: A Tutorial", IEEE Communications Magazine, July 1990, page 19 et seq. Note here that signaling messaging processors, as contemplated by the present invention, can include not only conventional STP's, but also the network endpoint signaling transfer point (NESTP) arrangement described in patent application Ser. No. 07/958845 filed Oct. 9, 1992, entitled "Telecommunications System SS7 Signaling Interface with Loose Coupling to its Host filed by Blatchford et al. and assigned to the same assignee as the present application.

In accordance with the present invention, a call selection processor called a signal director (SD) is a network element having the properties of a "full signaling end point" that is arranged to receive information relating to calls connected to any of the switches served by the SD, when those calls are call originations. In FIG. 1, SD 150 is shown as connected to STP 141, so that it can receive a copy of each initial address message (IAM) associated with origination of calls extended from switch 111 to switch 130. Likewise, a second SD 151 is shown connected to STP 142, so that it receives a copy of certain signaling messages (IAM's) relating to origination of calls extended from switch 132 to switch 122. If a signaling message indicates that it represents a message other than an IAM, such as a message relating to on-going calls or calls that are being torn down, copies are not provided to the SD. Note that other alternatives exist for sending call set up messages (IAM's) to the SD. In particular, the SD could monitor all the signaling links directly and itself extract and process those particular messages relating to calls arriving in a switch. Alternatively, the STP could send copies of all messages to the SD, and the SD could likewise extract some of the messages.

When SD 150 receives a signaling message containing information relating to a call origination, such as a copy of an IAM, it examines information in that signaling message relating, in general, to the calling and called parties, such as the dialed number and/or the ANI information for the call, to determine if the call requires special treatment. This examination is accomplished through a query to a database in or associated with the SD, using the dialed number, ANI, or other information in the signaling message as a query key. If the call does require special treatment, a message is transmitted from the SD to an appropriate applications processor (AP), such as applications processor 160 in FIG. 1. The last mentioned message is a query also containing information relating to the call, typically including the dialed number and ANI. This message is transmitted from SD 150 to STP 141 and then directly (or through other STP's in signaling network 140) to applications processor 160. Note here that the calling party information can include, in addition to or in lieu of ANI information, information derived from the caller's credit card or telephone calling card, or other information, and the called party information can include, in addition to or in lieu of dialed number information, information which is translated or derived from the dialed number.

Applications processor 160 may be configured much like a network control point (NCP) currently available from AT&T, and is essentially a database arranged to receive queries, look up stored information in accordance with retrieval keys contained in the queries, process that information in order to implement call processing, billing, recording or other functions, and return messages containing instructions for call processing or other switch actions. In accordance with the present invention, the call treatment messages are returned "directly" to the switch processing the call, in this case switch 130, meaning that the instructions are not returned to the SD that queried the application processor. Rather, the call treatment instructions proceed through STP 141 (and possibly through other STP's in signaling network 140) to switch 130.

Switch 130, as shown in FIG. 1, includes the conventional functional components typically found in a switch such as the 4ESS™ program controlled switch available from AT&T. These components are a signaling interface 131 for receiving signaling messages routed to the switch from the signaling network, including messages from STP 112, SD 150 and applications processor 160, and a CPU 136 for processing calls in accordance with call treatment instructions contained in such messages and with stored instructions that control other switch functions. A database 134 may include other program instructions and/or data used in processing calls. The switch fabric 133, through which calls are actually routed, is connected to other elements in the IXC network, including elements in the transport network 135 as well as switch 111 in LEC network 110. Connections within switch fabric 133 are made under the control of instructions received from CPU 136.

In accordance with the present invention, the programs that control the operation of switch 130 are different from those available today. As described in more detail below, switch 130 is arranged to begin certain timing and counting processes in response to receipt of a call origination, to await call treatment instructions for selected calls if instructed by SD 150 to do so, and to process calls in accordance with call treatment instructions received from applications processor 160 if those instructions are received within a predetermined time period, and otherwise to process the calls in accordance with default instructions.

Figure 2:
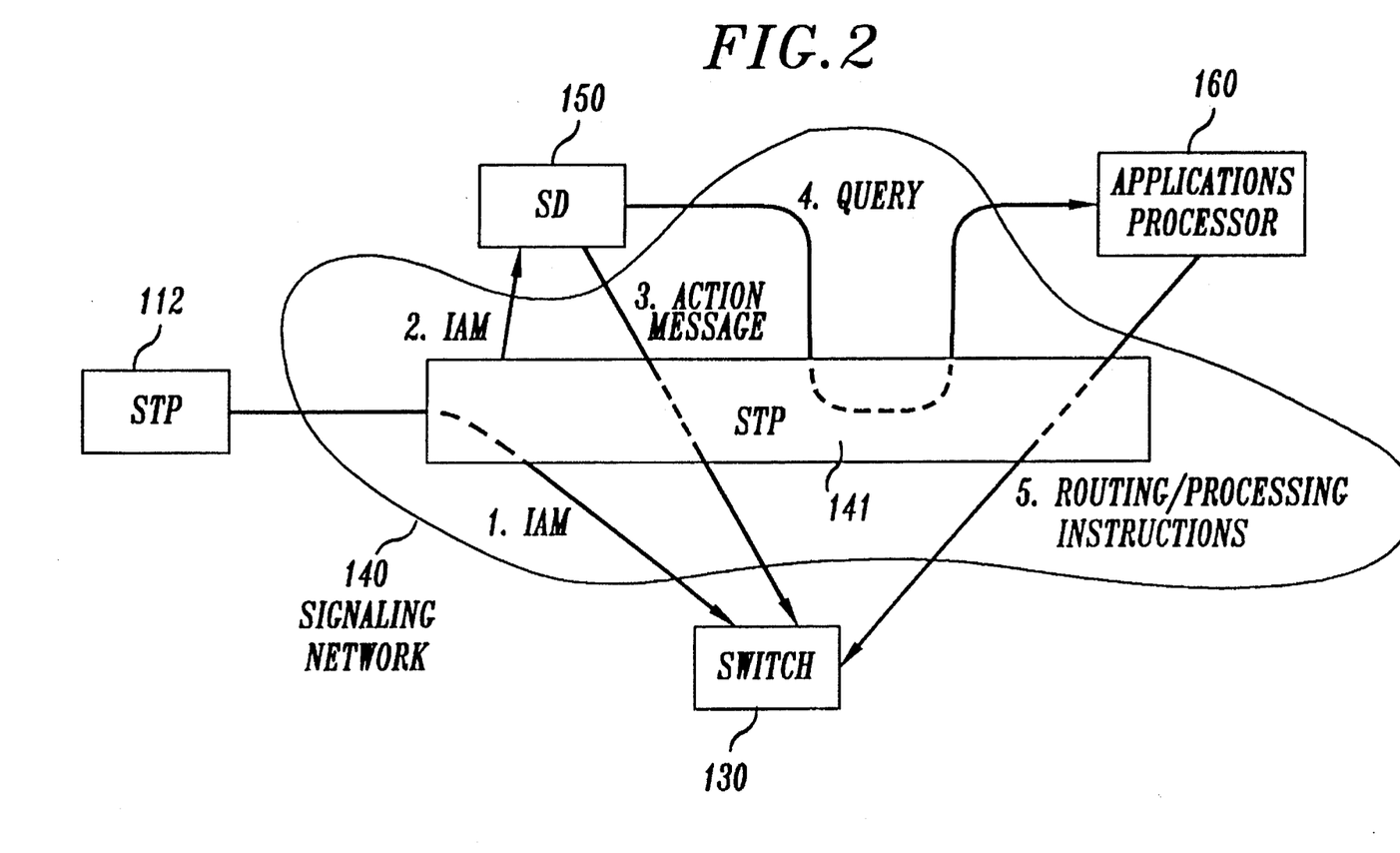
FIG. 2 is a diagram illustrating the signaling messages received and/or generated by certain of the network elements of FIG. 1.

FIG. 2 illustrates graphically the sequence in which certain signaling messages are received and/or generated by certain of the network elements of FIG. 1 during call set up. The elements in FIG. 2 retain the same reference designations as used in FIG. 1. The signaling messages are numbered 1 to 5, indicating the sequence in which the messages are generated. The first message, message 1, represents an IAM transmitted by STP 141 to switch 130, as a result of a call being originated and applied to switch 130. This IAM, which actually originates in switch 111 within LEC network 110, is routed via STP 112 and STP 141 to switch 130, and typically includes information pertaining to the dialed number, as well as ANI information pertaining to the originating telephone. However, in some situations, the IAM may include other information, such as a call type indicator and/or calling card number.

In accordance with the present invention, when message 1 is recognized by STP 141 as an IAM, a copy of the message is made, packaged in a Signaling Connection Control Part (SCCP) envelope and transmitted to SD 150 as message 2 using SS7 message transfer part (MTP) routing. In accordance with the invention, when SD 150 receives message 2, it queries its own database to determine if special treatment will be provided for the call, based upon the information provided in the IAM, typically dialed number and ANI. The SD generates message 3, called an action message (AM), and sends the AM through STP 141 to CPU 136 in switch 130 via signaling interface 131, directing that switch (a) proceed with processing, in the case of a call that is not a "selected" call, for example, a call that does not require special treatment, (b) wait for further instructions, in the case of a selected call, for example, a call that does require special treatment, or (c) deny or "kill" the call, in the case of certain other calls which which originate from certain telephones, are destined for certain telephones, or otherwise have characteristics recognized as indicating that such calls should be blocked or terminated. Note that in most applications, the action message described above will be formatted as a TCAP message, in accordance with CCITT recommendations Q.771 through Q.775, and routed via SS7 SCCP and MTP routing, in accordance with Q.711 through Q.714 and Q.701 through Q.704.

In the case of selected calls, e.g., calls requiring special treatment, SD 150 then generates a query message 4, requesting routing and processing information for the call, and routes the query to an appropriate applications processor, in this example, applications processor 160 shown in FIGS. 1 and 2. Routing of query message 4 (which also may be a TCAP message routed using SS7 SSCP routing) is via STP 141 and possibly other STP's in signaling network 140. Generally speaking, the query includes information obtained from the IAM, such as dialed number and ANI. In response to the query message 4, applications processor is arranged to generate call treatment instructions contained in a signaling message 5, and transmit that message directly to switch 130, advising the switch how to proceed. As stated above, the path for message 5 is from applications processor 160 through STP 141 and possibly other STP's in signaling network 140, without passing through SD 150. The call treatment instructions can include call processing instructions, access and egress instructions, recording and billing instructions, and so on. These instructions can, among other things, be used in switch 130 to enable certain features to be applied to the call, such as subaccount billing, abbreviated dialing, call forwarding, sequence calling, etc.

Figure 3:
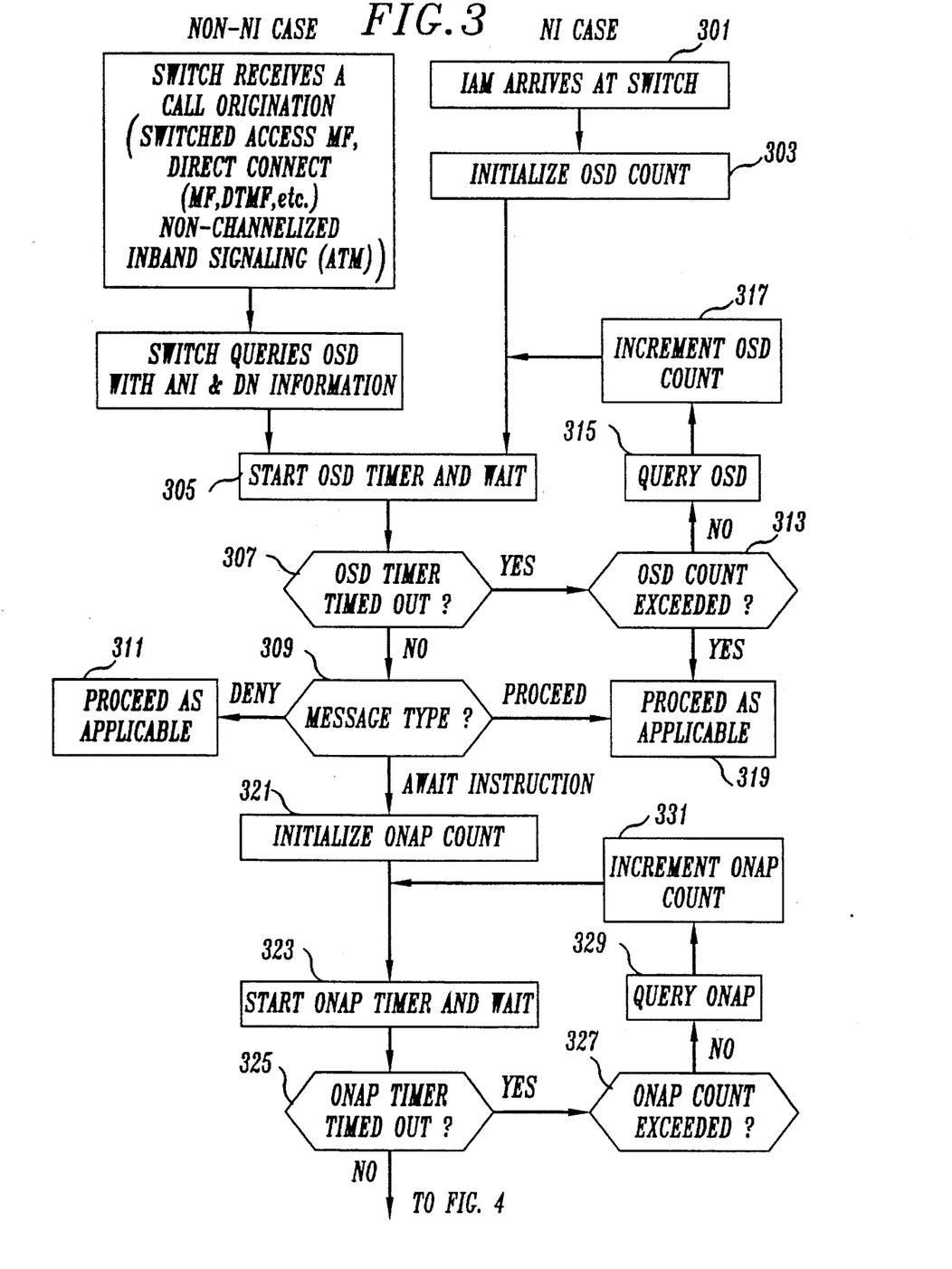
FIGS. 3 and 4 illustrate the processes performed in switch 130 of FIG. 1, relating to signaling messages.
Figure 4:
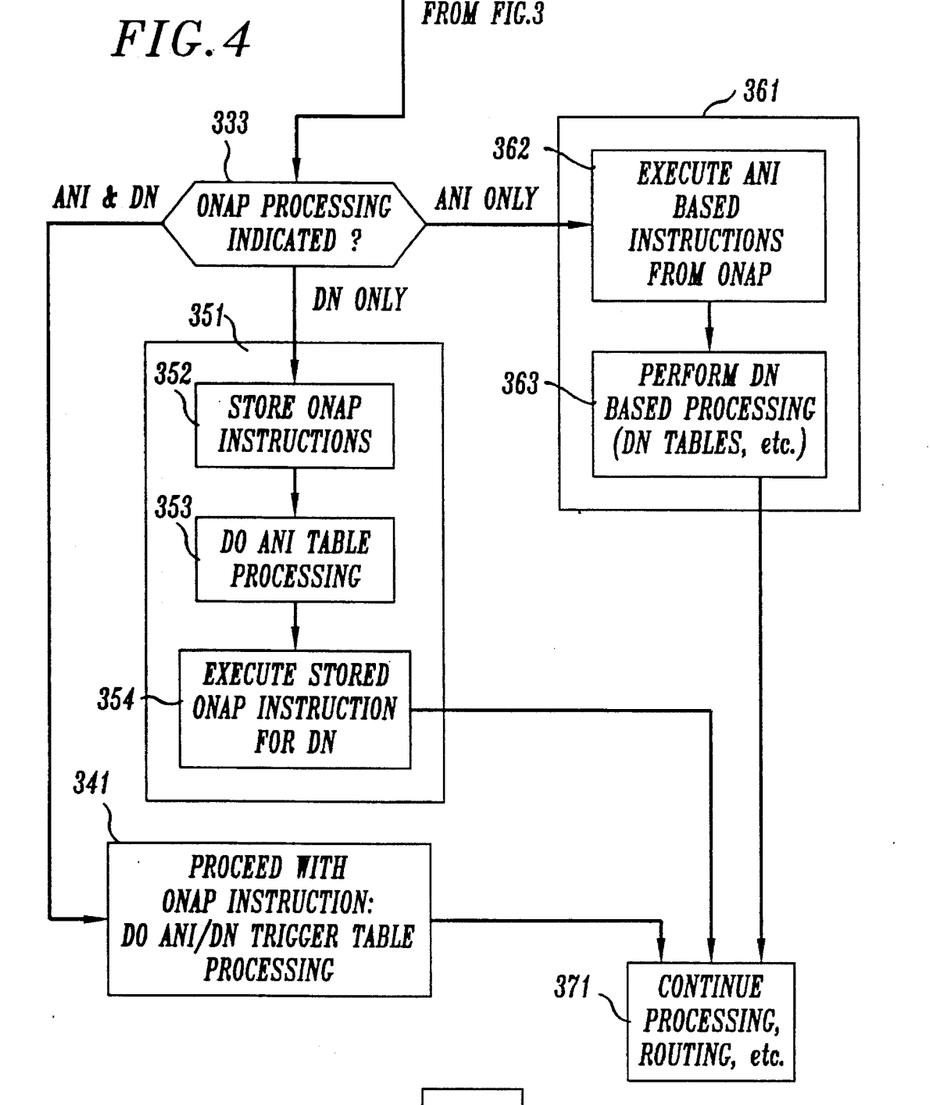
Figure 5:
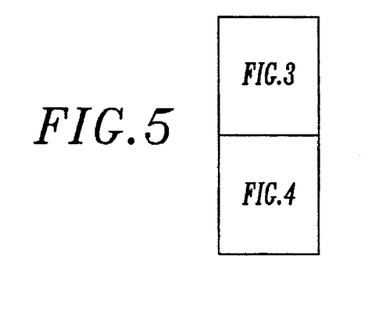
FIG. 5 illustrates the relationship between FIGS. 3 and 4.
Figure 6:
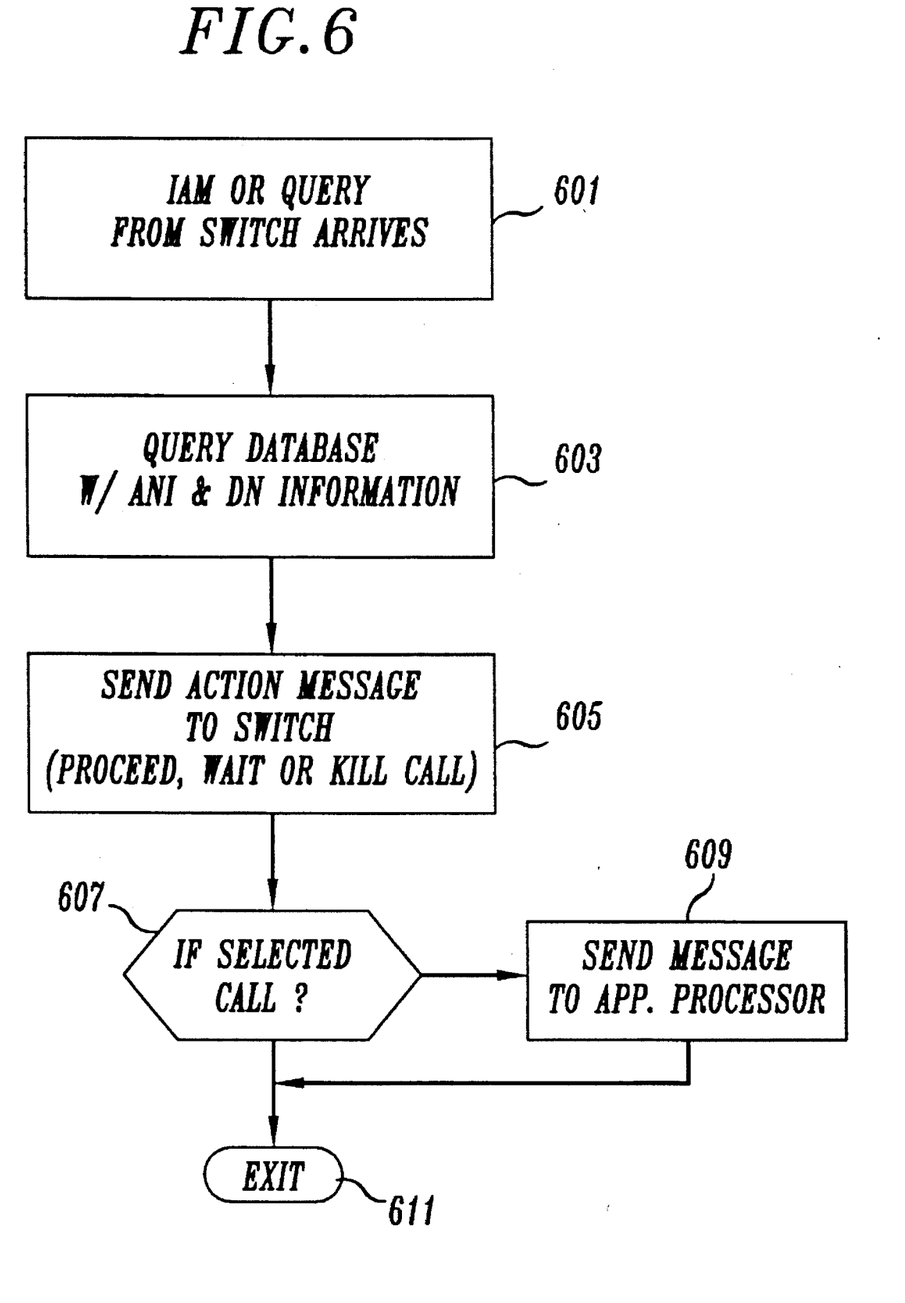
FIG. 6 illustrates the processes performed in SD 150 of FIG. 1.

The messages described above can be more fully appreciated by considering FIGS. 3 and 4, which illustrate the processes performed in switch 130, and FIG. 6, which illustrates the processes performed in SD 150.

The process performed in switch 130, illustrated in FIGS. 3 and 4, is initiated when an IAM is received in step 301. This causes initialization of an "SD count" in step 303 (for purposes described below) and initiation of an SD timer in step 305, which allows the switch to query the SD if the SD does not provide an action message within a predetermined time. In particular, a determination is made in step 307 as to whether the SD timer has timed out. If so, a determination is made in step 313 as to whether or not the SD count has been exceeded, this being done to assure that an excessive number of queries are not launched. If the result in step 313 is negative, i.e., if the SD count threshold is not exceeded, a query is launched from the switch to the SD in step 315, and the SD count is incremented in step 317. The process then continues with step 305. On the other hand, if the result in step 313 is positive, indicating the the number of queries launched exceeded the SD count threshold, the switch is arranged to proceed without the AM, in step 319. This means that the switch will process the call conventionally.

Note here that the timing and querying processes performed in the switch are considerably different from current processing. Conventionally, a switch may receive a signaling message and, in response to the message, generate a query. To protect against the possibility that a response to the query will be delayed or never received, the switch conventionally begins a timing process when the query is launched, so that another query or default processing can occur if the timer "times out". By way of contrast, in accordance with the present invention, the switch begins timing in step 305 in response to receipt of a signaling message. This is because the switch will receive instructions in an action message from the SD (proceed, wait or deny) without the need to launch any query.

Until the SD timeout period occurs, switch 130 monitors for an action message in step 309; this can be a "proceed instruction", which causes the switch to proceed with call processing in step 319, a "deny instruction", which causes the switch to provide "final handling" in step 311, or a "wait instruction", which places the switch in a wait state until a message containing call treatment instructions is received from applications processor 160.

If the action message received by the switch in step 309 is a wait message, the process continues with steps 321 and 323, in which an "AP count" is initialized (for purposes described below) and an AP timer is started, respectively. This timer allows the switch to query the applications processor for call treatment instructions if the applications processor does not provide a signaling message containing those instructions within a predetermined time. A determination is made in step 325 as to whether or not the AP timer has timed out. If so, and it is determined in step 327 that the AP count threshold has not been exceeded, the switch is arranged to launch a query to applications processor 160 requesting that call treatment instructions be provided. Then, in step 331, the AP count is incremented, and the process is repeated, beginning at step 323. On the other hand, if the AP count threshold has been exceeded, the switch is arranged to perform default processing, as though the "wait instruction" had been a "proceed instruction".

As long as the AP timer has not timed out in step 325, the switch awaits call treatment instructions in step 333. These instructions can include, in addition to the the instructions themselves, "origin" information of three general varieties: first, if the query to applications processor 160 and its response was based upon both the ANI and dialed number information, the call treatment instructions include a first origin code indicating that step 341 should be performed, wherein the switch proceeds to execute the call treatment instructions without itself performing either ANI or dialed number processing. Second, if the query to applications processor 160 and its response was based only upon dialed number information, the call treatment instructions include a second origin code indicating that steps 351 should be performed, wherein the switch proceeds to execute the call treatment instructions by (a) storing the received instructions, in step 352, (b) performing ANI table processing, in step 353, and (c) thereafter executing the stored instructions received from applications processor 160 based on the dialed number, in step 354. This sequence of steps is performed to assure that features associated with both the dialed number and ANI can be ascertained, and, to the extent that they are not inconsistent with each other, all of such features can be applied to the call. On the other hand, if the some or all of the features are inconsistent or conflict with each other, processes arranged to resolve the inconsistencies can be applied. Third, if the query to applications processor 160 and its response was based only upon ANI information, the call treatment instructions include a third origin code indicating that steps 361 should be performed, wherein the switch proceeds to execute the call treatment instructions by (a) executing the received instructions from applications processor 160 without further local ANI processing, in step 362, and (b) thereafter performing dialed number based processing, in step 363. This sequence of steps is performed for reasons similar to those stated above, namely, to assure that features associated with both the dialed number and ANI can be ascertained, and, to the extent that they are not inconsistent with each other, all of such features can be applied to the call. In this sequence, however, the ANI based instructions from the applications processor are executed immediately and not stored, since, in general, it is advantageous to perform calling pay features before performing called party features. In all of the above instances, when processing in accordance with steps 341, 354 or 363 is completed, the switch proceeds with call treatment and routes the call through transport network 135 of FIG. 1.

The present invention may also be used in the case where a call is extended to a switch via a direct connection, such that an SS7 signaling message is not provided to the switch together with the call. In this event, the switch receiving the call, for example switch 130, also receives origination signaling in the form of multifrequency tones, DTMF tones, ISDN call setup messages, non-channelized signaling, or other non-SS7 signaling in step 351. Then, in step 353, the switch extracts and obtains ANI information and dialed number information for the call from the signaling information and/or the trunk group characteristics, and routes a query to SD 150 containing that information. Thereafter, the process of FIGS. 3-4 continues with step 305, as described above. Techniques for obtaining ANI and dialed number information in these environments is well known: see E. G. Sable, H. W. Ketfler, "Intelligent Network Directions," AT&T Technical Journal, Vol. 70, Nos. 3–4, Summer 1991, pp. 2–10; Ameritech, "Ameritech Intelligent Network Release O Architecture Overview," AM SR-OAT-000019, Issue 1, Arlington Heights; S. Horing, J. Z. Menard, R. E. Stachler, and B. J. Yokelson, "Stored program Controlled Network Overview," Bell System Technical Journal, Vol. 61, No. 7, Part 3, September 1982, pp. 1579–1588; J. J. Lawser, R. E. LeCronier, and R. L. Simms, "Stored Program Controlled Network: Genetic Network Plan," Bell System Technical Journal, Vol. 61, No. 7, Part 3, September 1982, pp. 1589–1598; and CCITT recommendation Q.931.

The process performed in SD 150, illustrated in FIG. 6, begins in step 601, wherein the SD receives an IAM from an associated STP, in this case, STP 141, or a query from switch 130. In step 603, information in the IAM or query, for example, the dialed number and ANI information, is used to query the SD's own database, to determine if the call is a selected call, for example, one that requires special treatment. If the call is other than a selected call, SD 150 sends an action message to switch 130 in step 605, directing it to proceed with call processing. On the other hand, if the call is a selected call, SD 150 sends an action message to switch 130 in step 605, requesting that switch to wait for call treatment instructions from applications processor 160. Note that in some circumstances, the action message may direct the switch to deny or "kill" the call, so that the call will not be completed. In step 607, if the call was determined to be a "selected" call, then SD 150 transmits a query to applications processor 160 in step 609, requesting call treatment instructions for the call. The process of FIG. 6 then ends in step 611, and returns to processing of other signaling messages.

Figure 7:
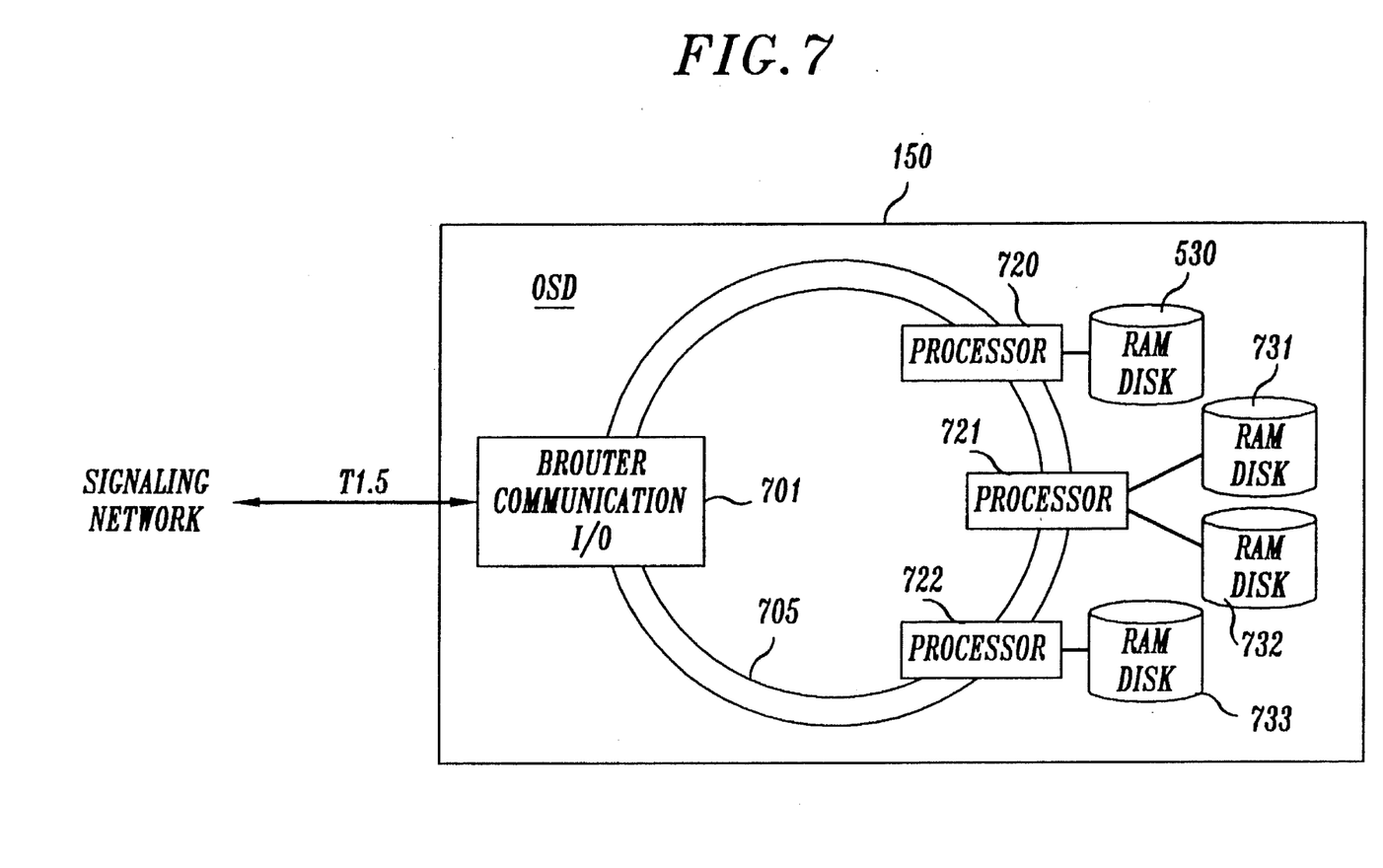
FIG. 7 is a block diagram of a typical Signal Director (SD) in accordance with the present invention.

FIG. 7 is a block diagram of a typical Signal Director (SD) in accordance with the present invention. Each SD is connected to the signaling network, typically via a high speed data link such as a T1.5 channel. Messages destined for the SD are received in a brouter 701 which acts as an input/output interface to a common bus 705. Each IAM relating to a call, which typically includes dialed number and ANI information, is routed on bus 705 to an available query processor 720–722, which performs a database lookup using information extracted from the IAM as a retrieval key. The query is intended to determine if the call is a selected call, for example, one that requires special treatment, or if the call is not a selected call, such that it can be treated in the normal fashion. Each query processor 720–722 is connected to one or more RAM disks, such as RAM disks 730–733, which actually store the relevant information that can be processed in a query processor to generate the action message that is formatted in response to a query. The information stored in RAM disks 730–733 also identifies a particular applications processor which may contain call treatment information for a particular call, based upon the characteristics (e.g., dialed number or ANI) of that call. Note that, in accordance with our invention, each SD, using its RAM disks, stores a record for every ANI and for every dialed number for which special treatment is desired.

In a typical implementation, each SD should be arranged to store up to 100 million records, each containing up to 100 bytes of information. Typically, each SD is arranged to accommodate approximately 2000 queries per second, with a 50 millisecond average processing delay. The capacity of the SD to handle transactions must be sufficient to assure that as many IAM's as arrive in one SS7 region (i.e., as arrive and are processed by one pair of STP's) can be accommodated.

Figure 8:
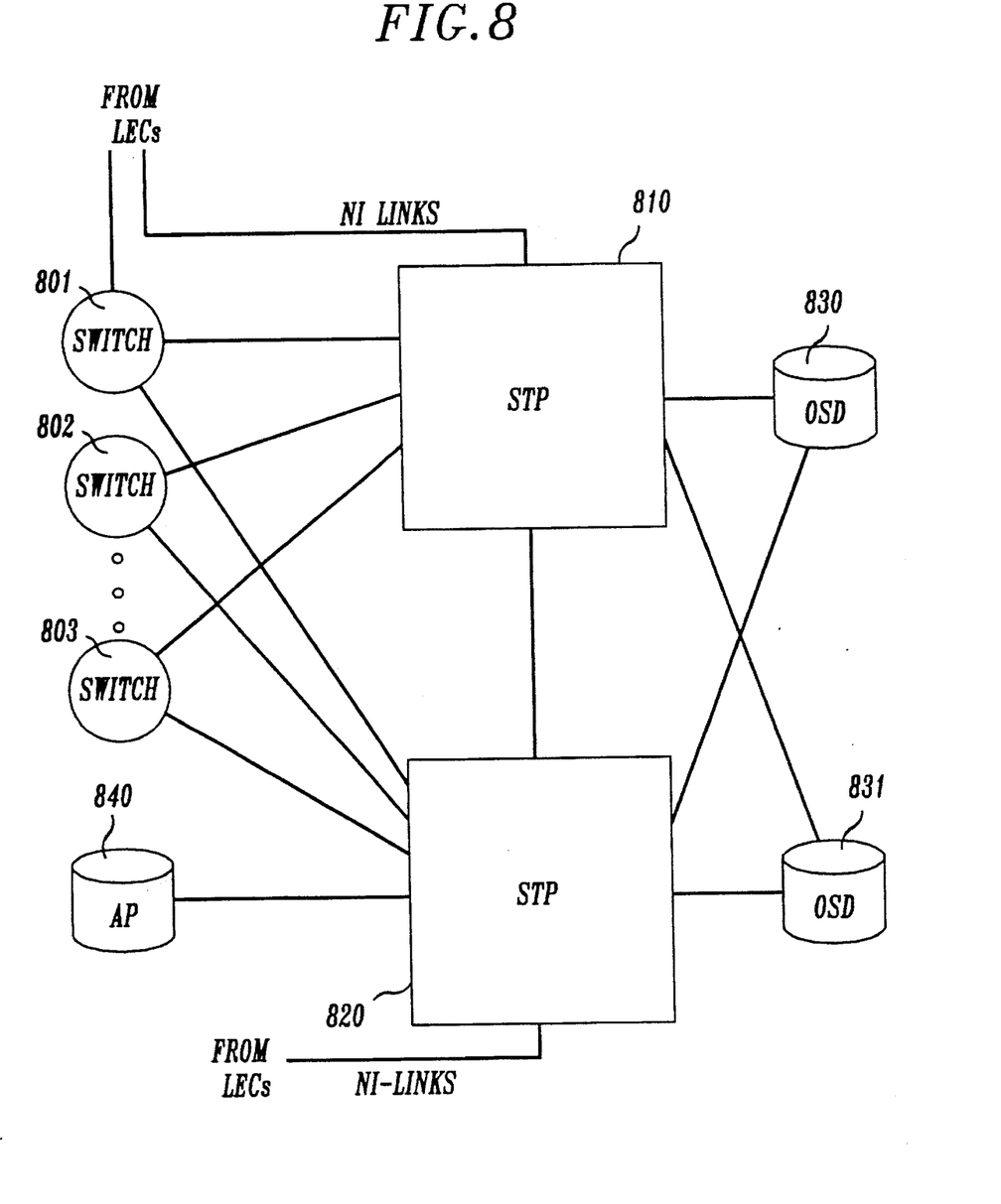
FIG. 8 illustrates the connection arrangement among a series of SD's, applications processors, telecommunications switches, and signaling message processors.

The connection arrangement among a series of SD's, applications processors and telecommunications switches is illustrated in FIG. 8. As shown, each switch, such as switches 801–803, is cross-connected to a pair of STP's 810 and 820, via signaling links. This pairing of STP's is conventional, and is done for reliability purposes. Note that each STP pair serves multiple switches. Each switch (such as switches 801–803) receives calls from one or more LEC's, and signaling messages relating to those calls on signaling links known as "network interconnect" or NI signaling links. In accordance with our invention, SD's 830 and 831 are also paired for reliability, and each SD is connected to each STP 810 and 820 in the pair through signaling links. Identical data will be stored in each SD, so that, in the event of a failure of one SD, the other SD will perform the required functions. In the arrangement of FIG. 8, note that SD's 830 and 831 serve multiple switches. Note also, from FIG. 8, that the application processor (AP) 840 is interconnected with both STP's in a pair in a similar fashion. Thus, application processor 840 is connected to both STP's 810 and 820 through signaling links.

Various modifications and adaptations of the present invention will be apparent to those skilled in the art. For this reason, the invention is to be limited only by the appended claims. For example, while ANI information was used in the call selection unit shown in the figures, it is to be understood that other information which describes the calling party, such as a calling card number, can be used instead.

Also, while the previous description illustrated our invention as deployed in an interexchange network, the invention could also be applicable to a local exchange network. For example, each call received in a terminating (LEC) switch could be processed in the same manner as described above, so that the terminating switch would, after receipt of such calls, await action instructions from an SD, based upon information contained in signaling messages associated with the routing of the call to that terminating switch. As with IAM's, the information used in the SD can be called and calling number information, or other information, and the SD will, for selected calls, route a query to an appropriate applications processor which returns processing instructions directly to the terminating switch.

We claim:

1. A method of processing telephone calls comprising the steps of monitoring signaling messages associated with telephone calls processed by a switch, when said messages are received in a signal transfer point connected to said switch, when a signaling message is determined to be an Initial Address Message (IAM), thereby indicating that it represents a new call arriving in said switch for processing, sending a copy of said signaling message to a call selection processor;

in said call selection processor, examining information contained in said signaling message to determine if said new call is to receive special treatment; and when said new call is to receive special treatment, (a) transmitting a message from said call selection processor to said switch, directing said switch to await further instructions; (b) transmitting a query message pertaining to said new call from said call selection processor to an applications processor; (c) transmitting a response to said query containing treatment instructions from said applications processor directly to said switch; and (d) processing said new call in accordance with said treatment instructions.

2. The method defined in claim 1 wherein when said new call is not to receive special treatment, said method includes the step of transmitting a message from said call selection processor to said switch, directing said switch to proceed with call processing.

3. The method defined in claim 1 wherein said information examining step includes examining information relating to the origin and/or destination of said new call.

4. The method defined in claim 1 wherein said query message includes origin and/or destination information contained in said IAM.

5. The method defined in claim 1 wherein said call selection processor is further arranged to process each call by:

examining information contained in said signaling message relating to the origin and/or destination of said new call to determine if said new call is to be terminated; and when said new call is to be terminated, routing a message from said call selection processor to said switch directing said switch to terminate said call.

6. A method of processing originating telephone calls in a telecommunications network, said network including a switch for receiving said originating telephone calls and processing said originating telephone calls in accordance with call treatment instructions, said network including a call selection processor connected to said switch for processing signaling messages associated with said telephone calls, said method comprising the steps of monitoring signaling messages transmitted to said call selection processor to identify particular ones of said signaling messages indicating said originating telephone calls, responsive to identification of said particular ones of said signaling messages, querying a database using information relating to said originating telephone calls, which information is contained in said particular ones of said signaling messages, to determine if any of said originating telephone calls require special treatment; and for the ones of said originating telephone calls that require special treatment, transmitting a message from said call selection processor to said switch, directing said switch to await said call treatment instructions for said ones of said originating telephone calls.

7. The method defined in claim 6 wherein said information relating to said ones of said originating telephone calls includes calling and called party information.

8. The method defined in claim 6 further including the steps of transmitting a query message pertaining to said ones of said originating telephone calls to an applications processor, routing a response to said query, containing said call treatment instructions for each of said ones of said originating telephone calls, from said applications processor directly to said switch.

9. The method defined in claim 6 further including the step of processing said ones of said originating telephone calls in accordance with said call treatment instructions.

10. The method defined in claim 6 wherein, when other ones of said originating telephone calls do not require special treatment, transmitting a message to said switch, directing said switch to proceed with the processing said other ones of said originating telephone calls using default call treatment instructions.

11. A method of processing telephone calls in a telecommunications switch arranged to receive and process calls in accordance with call treatment instructions, said method comprising the steps of upon receipt in said telecommunications switch of a call requiring processing, initiating a timing process for said call, when a signaling message pertaining to said call is subsequently received in said telecommunications switch before termination of said timing process, processing said call in .said telecommunications switch in accordance with call treatment instructions contained in said signaling message, and when a signaling message pertaining to said call is not subsequently received in said telecommunications switch before termination of said timing process, transmitting a query from said telecommunications switch to request said call treatment instructions.

12. A method of processing telephone calls to obtain call treatment instructions for said telephone calls, said method comprising the steps of receiving signaling messages associated with call originations;

responsive to receipt of said signaling messages, querying a database using information relating to the calling and called parties involved in said call originations to determine if particular ones of said call originations require special treatment; and when particular ones of said call originations require special treatment, transmitting a message to a switch handling said particular ones of said call originations, said message directing said switch to await said call treatment instructions for said particular ones of said call originations.

13. A method of processing telephone calls to obtain call treatment instructions for processing said telephone calls in a telecommunications network switch, said method performed in a switch and in a call selection processor and a signaling message processor each connected to said switch, and said method comprising the steps of responsive to receipt of said telephone calls in said switch, placing said switch in a wait state to await said call treatment instructions;

responsive to receipt of signaling messages associated with call originations received in said switch, sending a message from said signaling message processor to said call selection processor that uses information relating to the calling and called parties involved in said telephone calls to determine if particular calls require special treatment; and when according to said call selection processor particular calls require special treatment, causing said switch to continue to await said call treatment instructions in response to a further signaling message directed to said switch from said call selection processor.

14. The invention defined in claim 13 wherein said querying step further includes determining the identity of a particular applications processor to be used in processing said particular calls requiring special treatment.

15. The method defined in claim 13 further including the steps of transmitting a query message pertaining to said particular calls to an applications processor.

16. The method defined in claim 15 wherein said query message includes information relating to the calling and called parties involved in said particular telephone calls.

17. The method defined in claim 13, wherein when said particular calls do not require special treatment, said method further includes the step of transmitting a message to said switch, directing said switch to proceed with default call treatment instructions.

18. The method defined in claim 13, further including the steps of storing a record in said database for each ANI, dialed number, and/or credit card for which special treatment is desired, and accessing said records during said querying step.

19. A method of processing telephone calls in a switch connected to an associated signaling message processor, said method comprising the steps of monitoring signaling messages received in said signaling message processor, each of said signaling messages being associated with a telephone call received for processing in said switch, copying by the signaling message processor a signaling message transmitted to said signaling message processor if said signaling message is an Initial Address Message (IAM), indicating that it represents a new call arriving in said switch for routing and processing, before processing of said new call in said switch, examining said information in said copy of said signaling message to determine if said new call requires special treatment; and when said call requires special treatment, transmitting a message from said signaling message processor to said switch, directing said switch to await further instructions.

20. The method of claim 19 further including the step of transmitting a message to said switch, directing said switch to proceed with call processing when said new call does not require special treatment.

21. The method of claim 19 further including the steps of transmitting a query message pertaining to said new call to an applications processor, and routing a response to said query containing processing instructions from said applications processor directly to said switch.

22. The method of claim 19 wherein said information includes ANI information contained in said signaling message relating to the called party originating said new call.

23. The method of claim 19 wherein said information includes dialed number information contained in said signaling message pertaining to the called party to whom said new call is destined.

24. The method of claim 19 wherein said information includes both ANI information contained in said signaling message relating to the calling party originating said new call, and dialed number information contained in said signaling message pertaining to the called party to whom said new call is destined.

25. The method defined in claim 24 wherein said examining step includes determining the address of a first applications processor based upon said ANI information;

determining the address of a second applications processor based upon said dialed number information; and selecting the address of one said first and second applications processors based upon predefined selection rules.

26. The method defined in claim 21 further including the step of processing said call in said switch in accordance with said processing instructions received from said applications processor.

27. Apparatus for processing telephone calls comprising
   a switch arranged to receive a telephone call, a signaling message processor connected to said switch and arranged to monitor signaling messages associated with telephone calls processed by said switch,
   a call selection processor connected to said signaling message processor,
   means in said signaling message processor for sending a copy of any of said signaling messages determined to be an Initial Address Message (IAM), thereby indicating that it represents a new call arriving in said switch for processing, to said call selection processor;
   an applications processor connected to said call selection processor; and
   means in said call selection processor for (a) examining information contained in said signaling message to determine if said new call is to receive special treatment and, when said new call is to receive special treatment, for (b) transmitting a message to said switch, directing said switch to await further instructions, and (c) transmitting a query message pertaining to said new call to said applications processor.

28. The invention defined in claim 27 wherein said applications processor includes means for transmitting a response to said query containing treatment instructions directly to said switch.

29. The apparatus defined in claim 28 wherein when said new call is not to receive special treatment, said applications processor is arranged to transmit a message to said switch, directing said switch to proceed with call processing.

30. The apparatus defined in claim 27 wherein said call selection processor is arranged to examine information relating to the origin and/or destination of said new call.

31. The apparatus defined in claim 27 wherein said query message includes origin and/or destination information contained in said IAM.

32. A system of processing originating telephone calls in a telecommunications network, said network including a switch for receiving said originating telephone calls and processing said originating telephone calls in accordance with call treatment instructions, said network including a signaling message processor connected to said switch for processing signaling messages associated with said telephone calls, said system comprising
   a database,
   means in said signaling message processor for monitoring signaling messages to identify particular ones of said signaling messages indicating said originating telephone calls,
   means in said signaling message processor responsive to identification of said particular ones of said signaling messages, for sending to said database messages that include information relating to said originating telephone calls, which information is contained in said particular ones of said signaling messages, to determine based on information in said database, if any of said originating telephone calls require special treatment; and
   means for routing a message to said switch from said database, directing said switch to await said call treatment instructions for ones of said originating telephone calls that require special treatment.

33. The system defined in claim 32 wherein said information relating to said ones of said originating telephone calls includes calling and called party information.

34. The system defined in claim 32 further including
   means for transmitting a query message pertaining to said ones of said originating telephone calls to an applications processor, and
   means for routing a response to said query message, containing said call treatment instructions for each of said ones of said originating telephone calls, from said applications processor directly to said switch.

35. The system defined in claim 32 further including means for processing said ones of said originating telephone calls in accordance with said call treatment instructions.

36. The system defined in claim 32 wherein, when other ones of said originating telephone calls do not require special treatment, said transmitting means is arranged to transmit a message to said switch, directing said switch to proceed with the processing said other ones of said originating telephone calls using default call treatment instructions.

37. Apparatus for processing telephone calls in a telecommunications switch arranged to receive and process calls in accordance with call treatment instructions, comprising
   means in said switch responsive to receipt of a call requiring processing, for initiating a timing process for said call,
   means in said switch for processing said call in accordance with call treatment instructions contained in said signaling message when a signaling message pertaining to said call is subsequently received before termination of said timing process, and
   means in said switch for transmitting a query to request said call treatment instructions when a signaling message pertaining to said call is not subsequently received before termination of said timing process.

38. Apparatus for processing telephone calls to obtain call treatment instructions for said telephone calls, comprising
   means for receiving signaling messages associated with call originations;
   means responsive to receipt of said signaling messages, for querying a database using information relating to the calling and called parties involved in said call originations to determine when particular ones of said call originations require special treatment; and
   means for transmitting a message to a switch handling said telephone calls, said message directing said switch to await said call treatment instructions handling said telephone calls when particular ones of said call originations require special treatment.

39. Apparatus for processing telephone calls to obtain call treatment instructions for processing said telephone calls in a telecommunications network, comprising
   a switch in said network; a call selection processor and a signaling message processor each connected to said switch;
   means in said switch responsive to receipt of said telephone calls, for placing said switch in a wait state to await said call treatment instructions;
   means in said signaling message processor responsive to receipt of signaling messages associated with call originations received in said switch, for sending from said signaling message processor to said call selection processor a message that uses information relating to the calling and called parties involved in said telephone calls to determine if particular calls require special treatment; and means in said call selection processor, for transmitting a further signaling message to said switch, said further signaling message directing said switch to await said call treatment instructions for particular calls that require Special treatment.

40. The invention defined in claim 39 wherein said call selection processor further includes means for determining the identity of a particular applications processor connected to elements in said network used in processing said particular calls requiring special treatment.

41. The invention defined in claim 39 further including means for transmitting a query message pertaining to said particular calls from said call selection processor to an applications processor connected to elements in said network.

42. The invention defined in claim 41 wherein said query message includes information relating to the calling and called parties involved in said particular telephone calls.

43. The invention defined in claim 39, wherein when said particular calls do not require special treatment, said transmitting means is arranged to transmit a message from said call selection processor to said switch, directing said switch to proceed with default call treatment instructions.

44. The invention defined in claim 39, further including means for storing a record in said database for each ANI, dialed number, and/or credit card for which special treatment is desired.

45. A system for processing telephone calls comprising means for monitoring signaling messages received in a signaling message processor, each of said signaling messages being associated with a telephone call received for processing in a switch connected to said signaling message processor, means for copying a signaling message transmitted to said signaling message processor if said signaling message is an Initial Address Message (IAM), indicating that it represents a new call arriving in said switch for routing and processing, means for examining information in said copy of said signaling message before processing of said new call in said switch, to determine if said new call requires special treatment; and means for transmitting a message to said switch, directing said switch to await further instructions if said call requires special treatment.

46. The system of claim 45 wherein said transmitting means is arranged to transmit a message to said switch, directing said switch to proceed with call processing when said new call does not require special treatment.

47. The system of claim 45 further including means for transmitting a query message pertaining to said new call to an applications processor, and means for routing a response to said query containing processing instructions from said applications processor directly to said switch.

48. The system of claim 45 wherein said information includes ANI information contained in said signaling message relating to the called party originating said new call.

49. The system of claim 45 wherein said information includes dialed number information contained in said signaling message pertaining to the called party to whom said new call is destined.

50. The system of claim 45 wherein said information includes both ANI information contained in said signaling message relating to the calling party originating said new call, and dialed number information contained in said signaling message pertaining to the called party to whom said new call is destined.

51. The system defined in claim 50 wherein said examining means includes:

means for determining (a) the address of a first applications processor based upon said ANI information; and (b) the address of a second applications processor based upon said dialed number information; and means for selecting the address of one said first and second applications processors based upon predefined selection rules.

52. The system defined in claim 47 further including means for processing said call in said switch in accordance with said processing instructions received from said applications processor.

* * * * *